(12) United States Patent
Lamesch et al.

(10) Patent No.: US 9,656,575 B2
(45) Date of Patent: May 23, 2017

(54) HEATING ELEMENT OPERATED AS CAPACITIVE SENSING ELECTRODE

(75) Inventors: Laurent Lamesch, Reichlange (LU); Thomas Meyers, Bitburg (DE)

(73) Assignee: IEE International Elecrtonics & Engineering S.A., Echternach (LU)

(*) Notice: Subject to any disclaimer, the term of this patent is extended or adjusted under 35 U.S.C. 154(b) by 499 days.

(21) Appl. No.: 14/000,670

(22) PCT Filed: Feb. 21, 2012

(86) PCT No.: PCT/EP2012/052940
§ 371 (c)(1),
(2), (4) Date: Sep. 3, 2013

(87) PCT Pub. No.: WO2012/113795
PCT Pub. Date: Aug. 30, 2012

(65) Prior Publication Data
US 2013/0334196 A1    Dec. 19, 2013

(30) Foreign Application Priority Data
Feb. 21, 2011    (LU) .......................................... 91791

(51) Int. Cl.
*B60L 1/02* (2006.01)
*H05B 1/00* (2006.01)
(Continued)

(52) U.S. Cl.
CPC ........... *B60N 2/002* (2013.01); *B60N 2/5685* (2013.01); *B60R 21/01532* (2014.10)

(58) Field of Classification Search
CPC .. B60N 2/002; B60N 2/5685; B60R 21/01532
(Continued)

(56) References Cited

U.S. PATENT DOCUMENTS 6,161,070 A    12/2000    Jinno et al.
6,392,542 B1    5/2002    Stanley
(Continued)

FOREIGN PATENT DOCUMENTS

EP    2085263 A1    8/2009
WO    9217344 A1    10/1992
WO    9513204 A1    5/1995

OTHER PUBLICATIONS

International Search Report for corresponding application PCT/EP2012/052940 filed Feb. 21, 2012, Mail date Mar. 23, 2013.
(Continued)

*Primary Examiner* — Dana Ross
*Assistant Examiner* — Lindsey C Staubach
(74) *Attorney, Agent, or Firm* — Reising Ethington P.C.

(57) ABSTRACT

A combined seat heater and capacitive occupancy sensor comprises a heater network including a heating element (11) and a capacitive sensing circuit connected to the heating element to sense a capacitive load. A first and a second interface are provided for connecting the heating element to a first and a second terminal of a power source, respectively. Each interface comprises electronically controlled switches (3, 5; 4, 6) arranged in series and defining an intermediate node (20; 21). An oscillator (8) is AC-coupled to the intermediate nodes to apply an oscillating voltage thereto. A current measuring means (9), AC-coupled between the oscillator and the heating element, keeps the AC-potential of the heating element at least substantially equal, in amplitude and phase, to the oscillating voltage on the intermediate nodes and to derive the capacitive load from a thus resulting current flowing into the heating element.

14 Claims, 3 Drawing Sheets

(51) Int. Cl.
    *H05B 3/00*     (2006.01)
    *H05B 11/00*     (2006.01)
    *A47C 7/72*     (2006.01)
    *A47C 31/00*     (2006.01)
    *B60N 2/00*     (2006.01)
    *B60N 2/56*     (2006.01)
    *B60R 21/015*     (2006.01)

(58) Field of Classification Search
    USPC .................... 219/201, 202, 217; 297/180.12
    See application file for complete search history.

(56) References Cited

U.S. PATENT DOCUMENTS

| | | | |
|---|---|---|---|
| 6,703,845 B2 | 3/2004 | Stanley et al. | |
| 7,521,940 B2 | 4/2009 | Koch et al. | |
| 2001/0045733 A1 | 11/2001 | Stanley et al. | |
| 2004/0113634 A1* | 6/2004 | Stanley | B60N 2/002 |
| | | | 324/661 |
| 2008/0048503 A1* | 2/2008 | Bruwer | H01H 13/063 |
| | | | 307/140 |
| 2009/0158857 A1* | 6/2009 | Shank | B60N 2/002 |
| | | | 73/780 |
| 2010/0327638 A1* | 12/2010 | Petereit | B60N 2/002 |
| | | | 297/180.12 |
| 2011/0029203 A1* | 2/2011 | Watson | B60R 21/01526 |
| | | | 701/45 |
| 2011/0121618 A1* | 5/2011 | Fischer | B60N 2/002 |
| | | | 297/180.12 |
| 2013/0147238 A1* | 6/2013 | Thinnes | B60N 2/5685 |
| | | | 297/180.12 |

OTHER PUBLICATIONS

Joshua Smith, "Electric Field Sensing for Graphical Interfaces" IEEE Computer Graphics and Applications, Issue May/Jun. 1998, pp. 54-60.
Written Opinion for corresponding application PCT/EP2012/052940 filed Feb. 21, 2012, Mail date Mar. 23, 2013.

* cited by examiner

HEATING ELEMENT OPERATED AS CAPACITIVE SENSING ELECTRODE

TECHNICAL FIELD

The present invention generally relates to a capacitive occupant detection system, e.g. for detecting the absence or presence of an occupant seated on a vehicle seat. More specifically, the invention relates to a combined seat heating and capacitively occupancy sensing device.

BACKGROUND

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies an oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

U.S. Pat. No. 6,703,845 discloses a combined seat heater and capacitive sensor, wherein each of the two terminals of the heating element is connected to the heating power supply via two transistors in series. The device may not operate in sensing mode and in heating mode at a time. When the device is in sensing mode, it attempts to actively keep the nodes between each pair of transistors at the same potential as the heating element in order to neutralize any open-switch impedance of the transistors. In the system of U.S. Pat. No. 6,703,845, the heating element is AC-coupled to the signal generator. The voltage on the heating element is input to a buffer amplifier, which basically copies the voltage to the nodes between the transistors. It has been found that with such configuration, the buffer amplifier cannot fully compensate the voltage difference, which leads to unsatisfying capacitance measurements.

BRIEF SUMMARY

The invention provides a combined seat heater and capacitive sensor, wherein the just mentioned problem is reduced or has a lesser impact on the capacitance measurement.

A combined seat heater and capacitive occupancy sensor, e.g. for a vehicle seat, comprises a heater network including a heating element (e.g. a heating wire, cable, fiber, bundle of fibers, trace or the like) connected between a first node and a second node to dissipate heat when a heating current is caused to flow between the first and second nodes, and a capacitive sensing circuit connected to the heating element to sense a capacitive load of the heating element (i.e. a capacitance between the heating element and a counter-electrode at reference potential, typically on ground potential). The heater network comprises a first interface for connecting the first node to a first terminal of a power source and a second interface for connecting the second node to a second terminal of the power source. The first interface comprises a first electronically controlled switch and a second electronically controlled switch arranged in series so as to define a first intermediate node there between. The second interface comprises a third electronically controlled switch and a fourth electronically controlled switch arranged in series so as to define a second intermediate node there between. According to the invention, the capacitive sensing circuit comprises an oscillator that is AC-coupled to the first and second intermediate nodes to apply an oscillating voltage to the first and second intermediate nodes, as well as a current measuring means AC-coupled between the oscillator and the heating element. The current measuring means is configured to keep the AC-potential of the heating element equal, or at least substantially equal, in amplitude and phase, to the oscillating voltage and to derive the capacitive load from a current flowing into the heating element in response to the AC-potential of the heating element being kept equal, or at least substantially equal, in amplitude and phase, to the oscillating voltage.

The current measuring means preferably comprises a transimpedance amplifier having a first input AC-coupled to the oscillator to receive the oscillating voltage as an AC component of a reference voltage, a second input AC-coupled to at least one of the first and second nodes, the transimpedance amplifier being configured to maintain a voltage on the second input node equal to the reference voltage by driving a current into the second input, the transimpedance amplifier having an output to provide a signal indicative at least of an AC component of the current driven into the second input.

The first, second, third and fourth switches are preferably field-effect transistors (e.g. MOSFETS). Alternatively, they could also be bipolar junction transistors or any other suitable transistors.

The gates of the two field-effect transistors that are (directly) connected to the first and second node, respectively, are preferably AC-coupled to the oscillator.

The oscillating signal preferably has a frequency comprised in the range from 50 to 500 kHz, preferably in the range from 70 to 150 kHz.

The combined seat heater and capacitive occupancy sensor preferably comprises a controller operatively connected to the first, second, third and fourth switches to open and close them. The controller may be configured to operate the heating element alternately in a heating mode and a capacitive sensing mode. The controller, when operating the heating element in the heating mode, preferably opens and closes at least one of the first, second, third and fourth switches in such a way as to achieve a pulse-width modulation and thus to regulate the heating power of the heating element. When operating the heating element in the capacitive sensing mode, the controller preferably keeps the first, second, third and fourth switches open in such a way as to DC-wise decouple the heating element from the power source. The controller may comprise e.g. an application-specific integrated circuit, a field-programmable gate array, a processor or the like. Preferably, the controller, the capacitive sensing circuit as well as the first and second interfaces of the heater network are integrated into a single unit.

Advantageously, the combined seat heater and capacitive occupancy sensor comprises a shield electrode disposed below the heating element, the shield electrode being AC-coupled to the oscillator. The shield electrode preferably extends somewhat beyond the borders of the heating element. By virtue of being AC-coupled to the oscillator, the shield electrode is driven with the same oscillating voltage as the first and second interfaces. That voltage being substantially equal to the voltage on the heating element during capacitive sensing, the electric field between the heating element and the shield electrode substantially cancels and the heating element becomes sensitive only in the direction opposite the shield electrode.

An aspect of the present invention concerns a vehicle seat equipped with a combined seat heater and capacitive occupancy sensor as described hereinabove or in the following detailed description.

BRIEF DESCRIPTION OF THE DRAWINGS

Further details and advantages of the present invention will be apparent from the following detailed description of several not limiting embodiments with reference to the attached drawings, wherein.

DETAILED DESCRIPTION

Figure 1:
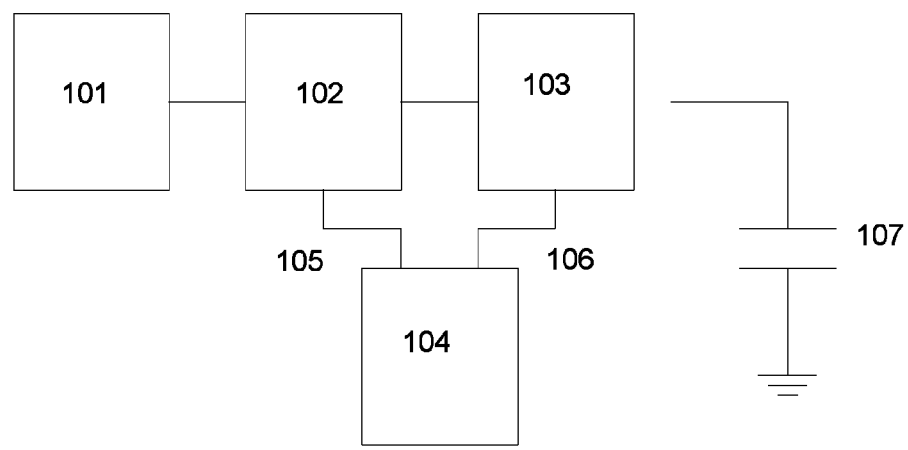
FIG. 1 is a high-level block diagram of a combined seat heater and capacitive occupancy sensor according to a preferred embodiment of the invention.

List of reference numbers used in FIG. 1:

| | |
|---|---|
| 101 | seat heater supply circuit |
| 102 | isolation/decoupling circuit |
| 103 | heating element |
| 104 | capacitive sensing circuit |
| 105 | guard/shield signal |
| 106 | sense signal |
| 107 | capacitance between heating element and ground, depending on occupancy state |

A seat heating element 103 is supplied with current by a seat heating circuit 101. The heating element 103 is connected to a capacitive sensing unit 104 via the sense connection 106 to be operated as a capacitive sensing electrode. During the capacitive measurement the seat heater supply circuit 101 has to be isolated from the heating element 103 and the capacitive sensing unit 104. Therefore, an isolation circuit 102 is provided that comprises a plurality of switches. The capacitive sensing circuit 104 generates an AC voltage and the current flowing into the heating element in response to the applied AC voltage is measured. To minimize the influence of parasitic capacitances inside the isolation circuit 102 and seat heater supply circuit 101, the AC voltage is provided via the guard line 105. The guard potential on node 105 is the same as the sense potential on node 106. So no sense current flows inside the isolation block 102. The alternative current flowing to ground through the seat heater 103, across capacitance 107, is measured by the capacitive sensing unit 104.

Figure 2:
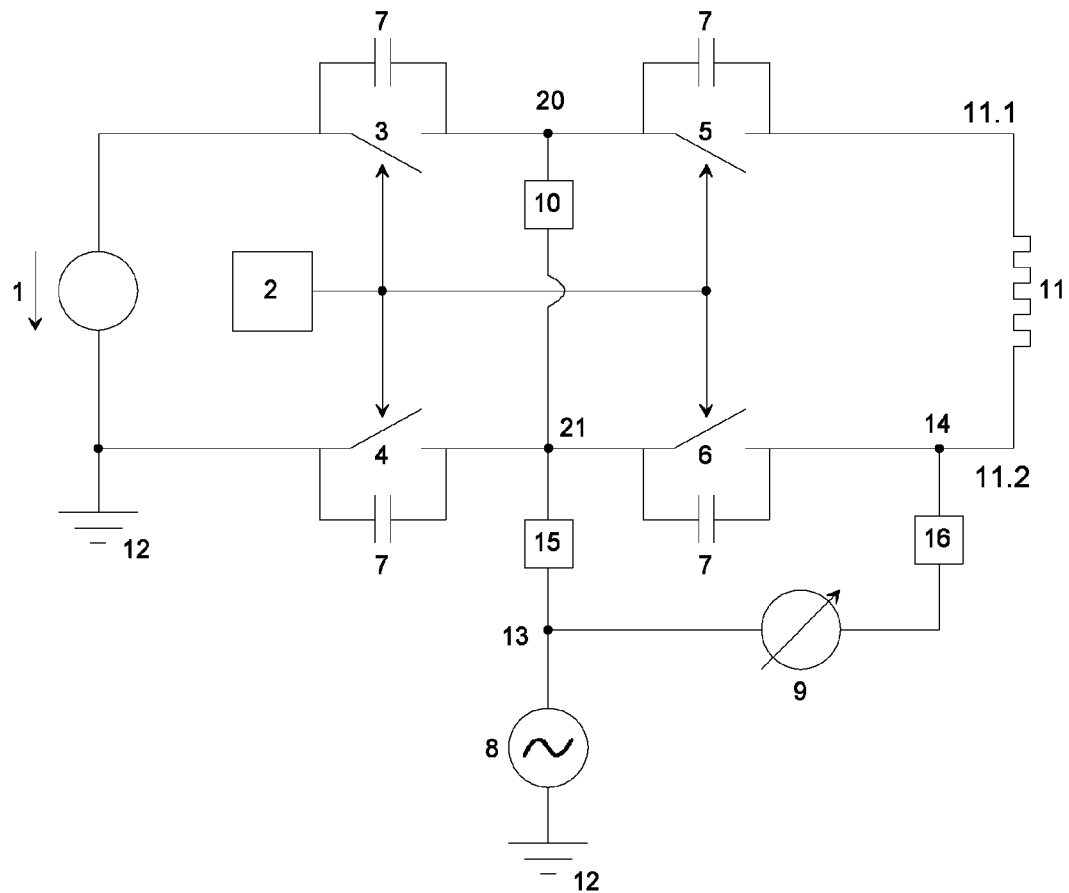
FIG. 2 is a schematic layout of a first circuit variant of a combined seat heater and capacitive occupancy sensor.
Figure 3:
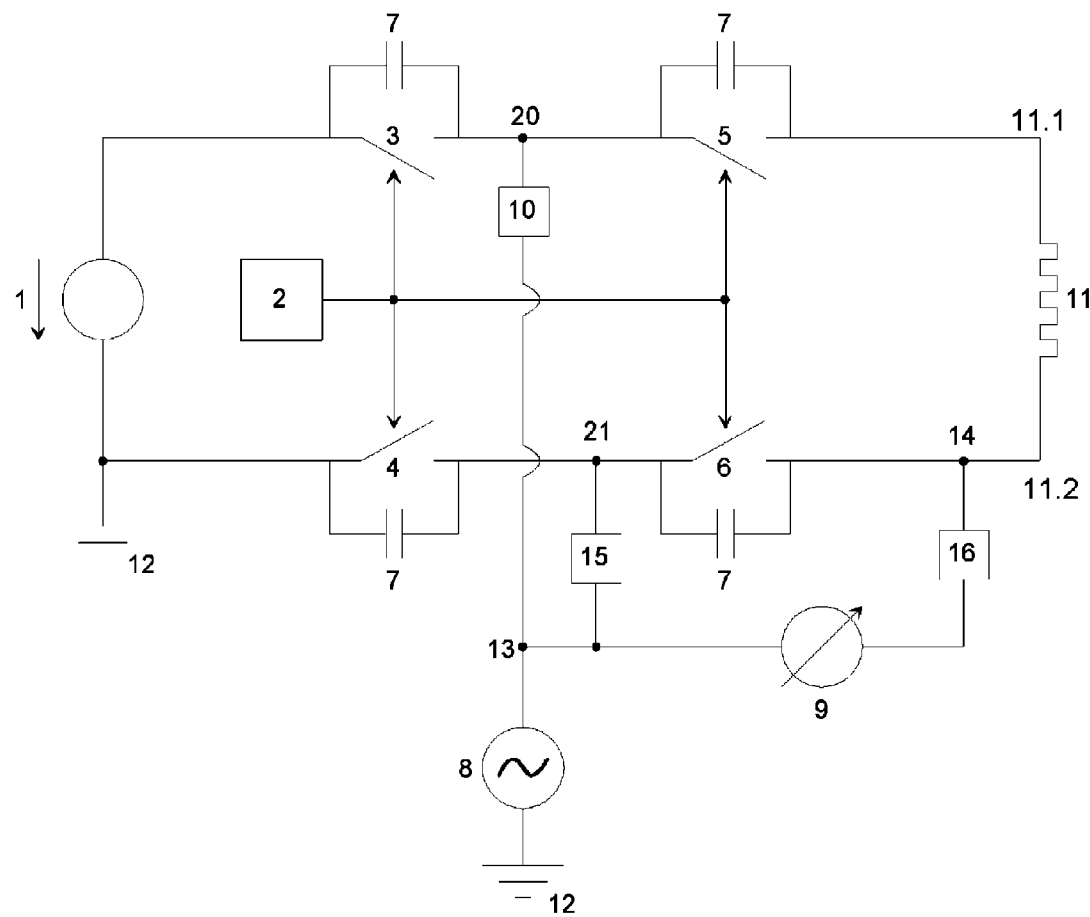
FIG. 3 is a schematic layout of a second circuit variant of a combined seat heater and capacitive occupancy sensor.
Figure 4:
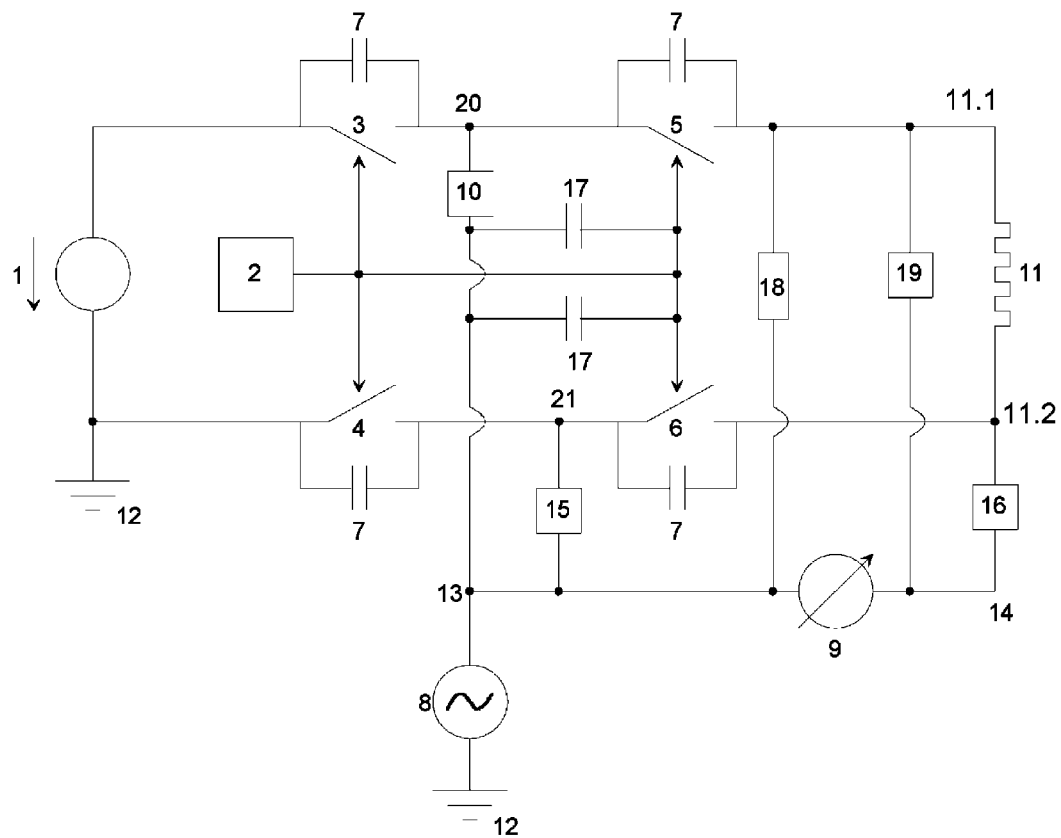
FIG. 4 is a schematic layout of a third circuit variant of a combined seat heater and capacitive occupancy sensor.

List of reference numbers used in FIG. 2-4:

| | |
|---|---|
| 1 | is the vehicle's power supply (battery) |
| 2 | is the seat heater control unit (controller) |
| 3, 5 | are high-potential-side power switches |
| 4, 6 | are low-potential-side power switches |
| 7 | is the parasitic capacitance of each power switch |
| 8 | is the AC source (oscillator) |
| 9 | is the current measurement unit |
| 10, 15, 16, 19 | are components (capacitors, impedances or switches) |
| 11 | is the heating element |
| 11.1, 11.2 | are the first and second nodes of the heating element, respectively |
| 12 | designates vehicle ground |
| 13 | "guard" node |
| 14 | "sense" node |
| 17 | is a coupling capacitor (FIG. 4 only) |
| 18 | is a high-ohmic resistor |
| 20 | is the intermediate node between switches 3 and 5 |
| 21 | is the intermediate node between switches 4 and 6 |

In heating mode, the heating control unit 2 actuates the switches 3, 4, 5, 6 periodically, normally with a low frequency (e.g. 20 Hz). The duty cycle when the supply 1 powers the seat heater 11, depends on the desired temperature. To protect/decouple the capacitive sensing circuit comprising of an AC voltage source 8 and a current meter 9, components 10, 15, 16 are provided. The parts are switches and/or capacitors.

In capacitive sensing mode, the switches 3, 4, 5, 6 are opened, so that the heating element does not heat. The switches of the heating circuit and isolation circuit have parasitic capacitances 7. To minimize the influence of these capacitances, the voltage source 8 generates an AC signal with a frequency much higher than the heater switching frequency (e.g. 100 kHz). The parts 10, 15, 16 as capacitors have a low impedance at the signal frequency and as switches are they are closed in capacitive sensing mode. So the same AC voltage is on the input and output side of the switches 5 and 6. The switches 3 and 4 are mandatory to have no short circuit of the AC voltage source 8 to ground. Then the same electrical potential is on node 20 and 21 and on the seat heater. In other words, the heating element 11 is guarded against the rest of the circuit.

The alternative current flowing into the heating element via current measurement unit 9 depends on the capacitance between the heating element 11 and ground. That capacitance, in turn, depends on the occupancy state. Current measurement unit 9 measures the current that flows to ground via the heating element 11. Due to the guard function, no (or at most an insignificant) AC current flows from the heating element 11 to ground across the parasitic capacitances of the switches 3, 4, 5, 6, which would otherwise distort the measurement. The by far greatest part of the sense current flows out of the seat heater across the capacitance to ground.

The combined seat heater and capacitive occupancy sensor may further operate in a (self-) diagnosis mode, wherein e.g. an interruption (break) of the seat heater circuit can be detected. With the circuit variant of FIG. 4 and assuming that at least one of components 16 and 19 can be switched high-ohmic for AC, this mode of operation may e.g. comprise the following steps: component 16 (alternatively: 19) is switched high-ohmic (e.g. by opening a switch in series with that component); switches 4 and 6 (alternatively 3 and 5) are closed; the AC voltage source 8 applies a voltage across the heating element 11; and the resulting current is measured with the current meter 9.

In the circuit variant of FIG. 4, the coupling capacitors 17 are used to get the same potential on the gate or base pins of the transistors 5 and 6 as on the heating element 11. The high-ohmic resistor 18 minimizes the source-drain (or collector-emitter) capacity of the transistors 5 and 6.

The parts 16 and 19 (each e.g. a capacitor and/or a switch) connect the first and the second nodes of the heating element to the sense node 14. This has the benefit that the AC voltage is applied at both ends of the heating element 11 and that a (single) break of the heating element 11 does prevent the system from measuring the occupancy capacitance.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A combined seat heater and capacitive occupancy sensor, comprising
   a heater network including a heating element connected between a first node and a second node to dissipate heat when a heating current is caused to flow between said first and second nodes,
   a capacitive sensing circuit connected to said heating element to sense a capacitive load of said heating element;
   wherein said heater network comprises a first interface for connecting said first node to a first terminal of a power source and a second interface for connecting said second node to a second terminal of said power source,
   wherein said first interface comprises a first electronically controlled switch and a second electronically controlled switch arranged in series so as to define a first intermediate node there between;
   wherein said second interface comprises a third electronically controlled switch and a fourth electronically controlled switch arranged in series so as to define a second intermediate node there between;
   wherein said capacitive sensing circuit comprises
   an oscillator that is AC-coupled to said first and second nodes through said first and second intermediate nodes to apply an oscillating voltage to said first and second nodes; and
   current measuring means AC-coupled between said oscillator and said heating element configured to keep the AC-potential of said heating element equal, or at least substantially equal, in amplitude and phase, to said oscillating voltage and to derive said capacitive load from a current flowing into said heating element in response to said AC-potential of said heating element being kept equal, or at least substantially equal, in amplitude and phase, to said oscillating voltage.

2. The combined seat heater and capacitive occupancy sensor as claimed in claim 1, wherein said current measuring means comprises a transimpedance amplifier having a first input AC-coupled to said oscillator to receive said oscillating voltage as an AC component of a reference voltage, a second input AC-coupled to at least one of said first and second nodes, said transimpedance amplifier being configured to maintain a voltage on said second input node equal to said reference voltage by driving a current into said second input, said transimpedance amplifier having an output to provide a signal indicative at least of an AC component of said current driven into said second input.

3. The combined seat heater and capacitive occupancy sensor as claimed in claim 1, wherein said first, second, third and fourth switches are field-effect transistors.

4. The combined seat heater and capacitive occupancy sensor as claimed in claim 3, wherein the gates of the two field-effect transistors that form those among the first, second, third and fourth switches that are connected to said first and second node, respectively, are AC-coupled to said oscillator.

5. The combined seat heater and capacitive occupancy sensor as claimed in claim 1, wherein said oscillating signal has a frequency comprised in the range from 50 to 500 kHz.

6. The combined seat heater and capacitive occupancy sensor as claimed in claim 1, comprising a controller operatively connected to said first, second, third and fourth switches to open and close them.

7. The combined seat heater and capacitive occupancy sensor as claimed in claim 6, wherein said controller is configured to operate said heating element alternately in a heating mode and a capacitive sensing mode.

8. The combined seat heater and capacitive occupancy sensor as claimed in claim 7, wherein said controller, when operating said heating element in said heating mode, opens and closes at least one of said first, second, third and fourth switches in such a way as to achieve a pulse-width modulation and thus to regulate the heating power of said heating element.

9. The combined seat heater and capacitive occupancy sensor as claimed in claim 7, wherein said controller, when operating said heating element in said capacitive sensing mode, keeps said first, second, third and fourth switches open in such a way as to DC-wise decouple said heating element from said power source.

10. The combined seat heater and capacitive occupancy sensor as claimed in claim 1, comprising a shield electrode disposed below said heating element, said shield electrode being AC-coupled to said oscillator.

11. The combined seat heater and capacitive occupancy sensor as claimed in claim 1, wherein said current measuring means is a transimpedance amplifier.

12. The combined seat heater and capacitive occupancy sensor as claimed in claim 11, wherein said first, second, third and fourth switches are field-effect transistors.

13. A vehicle seat equipped with a combined seat heater and capacitive occupancy sensor that comprises
a heater network including a heating element connected between a first node and a second node to dissipate heat when a heating current is caused to flow between said first and second nodes,
a capacitive sensing circuit connected to said heating element to sense a capacitive load of said heating element;
wherein said heater network comprises a first interface for connecting said first node to a first terminal of a power source and a second interface for connecting said second node to a second terminal of said power source,
wherein said first interface comprises a first electronically controlled switch and a second electronically controlled switch arranged in series so as to define a first intermediate node there between;
wherein said second interface comprises a third electronically controlled switch and a fourth electronically controlled switch arranged in series so as to define a second intermediate node there between;
wherein said capacitive sensing circuit comprises
an oscillator that is AC-coupled to said first and second intermediate nodes to apply an oscillating voltage to said first and second intermediate nodes; and a transimpedance amplifier AC-coupled between said oscillator and said heating element configured to keep the AC-potential of said heating element equal, or at least substantially equal, in amplitude and phase, to said oscillating voltage and to derive said capacitive load from a current flowing into said heating element in response to said AC-potential of said heating element being kept equal, or at least substantially equal, in amplitude and phase, to said oscillating voltage.

14. The vehicle seat as claimed in claim 13, wherein transimpedance amplifier has a first input AC-coupled to said oscillator to receive said oscillating voltage as an AC component of a reference voltage, a second input AC-coupled to at least one of said first and second nodes, said transimpedance amplifier being configured to maintain a voltage on said second input node equal to said reference voltage by driving a current into said second input, said transimpedance amplifier having an output to provide a signal indicative at least of an AC component of said current driven into said second input.

* * * * *